United States Patent
Bonte et al.

(10) Patent No.: US 11,529,851 B2
(45) Date of Patent: Dec. 20, 2022

(54) COMPOSITE VEHICLE DOOR COMPONENTS FORMED BY SHEET MOLDING COMPOUND-RESIN TRANSFER MOLDING ASSEMBLIES

(71) Applicant: Continental Structural Plastics, Inc., Auburn Hills, MI (US)

(72) Inventors: Philippe Bonte, Pouance (FR); Marc-Philippe Toitgans, Pouance (FR); Dominique Boyer, Pouance (FR); Nicolas Godard, Pouance (FR)

(73) Assignee: TEIJIN AUTOMOTIVE TECHNOLOGIES, INC., Auburn Hills, MI (US)

( * ) Notice: Subject to any disclaimer, the term of this patent is extended or adjusted under 35 U.S.C. 154(b) by 131 days.

(21) Appl. No.: 16/332,235

(22) PCT Filed: Sep. 11, 2017

(86) PCT No.: PCT/US2017/050939
§ 371 (c)(1),
(2) Date: Mar. 11, 2019

(87) PCT Pub. No.: WO2018/049319
PCT Pub. Date: Mar. 15, 2018

(65) Prior Publication Data
US 2019/0217689 A1 Jul. 18, 2019

Related U.S. Application Data

(60) Provisional application No. 62/385,493, filed on Sep. 9, 2016.

(51) Int. Cl.
*B60J 5/00* (2006.01)
*B60J 5/04* (2006.01)

(52) U.S. Cl.
CPC ............ *B60J 5/0484* (2013.01); *B60J 5/0426* (2013.01); *B60J 5/0427* (2013.01); *B60J 5/0431* (2013.01);
(Continued)

(58) Field of Classification Search
CPC ...... B60J 5/0484; B60J 5/0427; B60J 5/0481; B60J 5/0456; B60J 5/0431; B60J 5/0433; B60J 5/0426
(Continued)

(56) References Cited

U.S. PATENT DOCUMENTS 4,945,682 A * 8/1990 Altman .................. B60J 5/0405
296/146.5
4,969,680 A * 11/1990 Shimoda .................. B60J 5/045
296/146.6
(Continued)

FOREIGN PATENT DOCUMENTS

EP 2818347 A1 12/2014
FR 3001921 A1 8/2014
(Continued)

OTHER PUBLICATIONS

EESR dated Mar. 16, 2020 for corresponding Int'l Application No. EP17849715.
(Continued)

*Primary Examiner* — Jerry E Redman
(74) *Attorney, Agent, or Firm* — Blue Filament Law PLLC

(57) ABSTRACT

A lightweight and simplified vehicle door assembly is provided with four main components, an upper frame positioned about the window, an inner frame structure, an outer body panel, and a composite reinforcement component. The composite reinforcement component provides an all-in-one solution for a side impact cross beam, as well as an upper
(Continued)

door reinforcement, a front door pillar reinforcement, and a rear door pillar reinforcement. The composite reinforcement component acts to reinforce the overall door structure, offers resistance to a side impact that limits the intrusion into the passenger compartment, and offers resistance to a frontal impact by maintaining the spacing between the vehicle A and B pillars (for a front door) and pillar C and D for a back door. A coupe vehicle door in which there is no window frame may be reinforced with the composite reinforcement component. The composite reinforcement component may have continuous or chopped fibers.

8 Claims, 4 Drawing Sheets

(52) U.S. Cl.
CPC ........... *B60J 5/0433* (2013.01); *B60J 5/0456* (2013.01); *B60J 5/0481* (2013.01)
(58) Field of Classification Search
USPC .......................................... 296/146.5, 146.6
See application file for complete search history.

(56) References Cited

U.S. PATENT DOCUMENTS

| | | | | |
|---|---|---|---|---|
| 5,536,060 A * | 7/1996 | Rashid | ............... | B60J 5/045 |
| | | | | 296/146.5 |
| 5,857,731 A * | 1/1999 | Heim | ............... | B60J 5/0404 |
| | | | | 248/475.1 |
| 5,908,216 A * | 6/1999 | Townsend | ............... | B60J 5/045 |
| | | | | 296/146.5 |
| 6,164,716 A * | 12/2000 | Palazzolo | ............... | B60J 5/045 |
| | | | | 296/146.6 |
| 6,176,542 B1 * | 1/2001 | Gooding | ............... | B60J 5/0416 |
| | | | | 296/146.5 |
| 6,196,619 B1 * | 3/2001 | Townsend | ............... | B60J 5/0444 |
| | | | | 296/146.6 |
| 6,302,474 B1 * | 10/2001 | Drysdale | ............... | B60J 5/0441 |
| | | | | 296/146.6 |
| 6,805,397 B1 * | 10/2004 | Chernoff | ............... | B60J 5/045 |
| | | | | 296/146.2 |
| 6,820,919 B2 * | 11/2004 | Florentin | ............... | B60J 5/0411 |
| | | | | 296/146.6 |
| 7,124,541 B2 * | 10/2006 | Fellner | ............... | B60J 5/0412 |
| | | | | 49/502 |
| 7,655,297 B2 | 2/2010 | Guha et al. | | |
| 7,766,414 B2 * | 8/2010 | Krajewski | ............... | B60J 5/0431 |
| | | | | 296/146.6 |
| 8,091,286 B2 | 1/2012 | Totani et al. | | |
| 8,226,151 B2 * | 7/2012 | Miyake | ............... | B60J 5/101 |
| | | | | 296/146.8 |
| 8,398,149 B2 * | 3/2013 | Weiter | ............... | B60J 5/0412 |
| | | | | 296/146.6 |
| 9,018,280 B2 | 4/2015 | Beach et al. | | |
| 9,815,353 B2 | 11/2017 | Jang et al. | | |
| 9,868,339 B2 | 1/2018 | Schijve et al. | | |
| 10,493,830 B2 * | 12/2019 | Hofer | ............... | B60J 5/0413 |
| 10,730,371 B2 * | 8/2020 | Migaki | ............... | B60J 5/0415 |
| 2004/0016101 A1 | 1/2004 | Malik et al. | | |
| 2004/0195860 A1 * | 10/2004 | Koellner | ............... | B60J 5/0466 |
| | | | | 296/146.5 |
| 2004/0217623 A1 | 11/2004 | Chernoff et al. | | |
| 2005/0182205 A1 | 8/2005 | Guha et al. | | |
| 2005/0188647 A1 | 9/2005 | Krajewski et al. | | |
| 2005/0206191 A1 * | 9/2005 | Bodin | ............... | B60J 5/0455 |
| | | | | 296/146.6 |
| 2007/0222256 A1 * | 9/2007 | Valentage | ............... | B60J 5/0448 |
| | | | | 296/146.6 |
| 2009/0165392 A1 | 7/2009 | Totani et al. | | |
| 2010/0052360 A1 * | 3/2010 | Hsu | ............... | B60J 5/044 |
| | | | | 296/146.6 |
| 2012/0228897 A1 * | 9/2012 | Anderson | ............... | B60J 5/0451 |
| | | | | 296/146.6 |
| 2013/0057018 A1 * | 3/2013 | Reese | ............... | B60J 5/042 |
| | | | | 296/146.6 |
| 2013/0088037 A1 * | 4/2013 | Schurter | ............... | B60J 5/0443 |
| | | | | 296/146.5 |
| 2014/0065371 A1 * | 3/2014 | Kopf | ............... | B60J 5/0418 |
| | | | | 428/157 |
| 2014/0110964 A1 * | 4/2014 | Schijve | ............... | B60J 5/0427 |
| | | | | 296/146.6 |
| 2014/0217773 A1 * | 8/2014 | Shimizu | ............... | B60J 5/0406 |
| | | | | 296/146.6 |
| 2015/0251617 A1 * | 9/2015 | Gandhi | ............... | B60R 21/0428 |
| | | | | 188/377 |
| 2015/0336447 A1 | 11/2015 | Glaumot | | |
| 2015/0352934 A1 * | 12/2015 | Mildner | ............... | B60J 5/107 |
| | | | | 296/146.5 |
| 2016/0137038 A1 | 5/2016 | Schijve et al. | | |

FOREIGN PATENT DOCUMENTS

| | | |
|---|---|---|
| JP | H05286364 A | 11/1993 |
| JP | 2009262916 A | 11/2009 |
| WO | 2010/071214 A1 | 6/2010 |
| WO | 2014210310 A1 | 12/2014 |

OTHER PUBLICATIONS

International Search Report dated Dec. 26, 2017 for International Application No. PCT/US2017/050939 filed Sep. 11, 2017.
Communication Pursuant to Article 94(3) EPC issued in corresponding Int'l Application No. EP17849715, dated Apr. 14, 2021.
First Office Action issued in corresponding Chinese Patent Appln. No. 201780052942.6, dated Oct. 29, 2021.

* cited by examiner

COMPOSITE VEHICLE DOOR COMPONENTS FORMED BY SHEET MOLDING COMPOUND-RESIN TRANSFER MOLDING ASSEMBLIES

CROSS-REFERENCE TO RELATED APPLICATION

This application claims priority of U.S. Provisional Patent Application Ser. No. 62/385,493 filed Sep. 9, 2016, which is incorporated herein by reference.

FIELD OF THE INVENTION

The present invention in general relates to vehicle construction and, to a four-part door assembly with a composite reinforcement component.

BACKGROUND OF THE INVENTION

The use of fiber inclusions to strengthen a matrix is well known to the art. Well established mechanisms for the strengthening of a matrix include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM) fiber strengthening has traditionally involved usage of chopped glass fibers. There is a growing appreciation in the field of molding compositions that replacing in part, or all of the glass fiber in molding compositions with carbon fiber can provide improved component properties; however, technical problems remain that include disparate layer joinder, fiber flow, fiber surface energies, and surface quality of the resultant component.

The use of carbon fibers in composites, sheet molding compositions, and resin transfer molding (RTM) results in formed components with a lower weight as compared to glass fiber reinforced materials. The weight savings achieved with carbon fiber reinforcement stems from the fact that carbon has a lower density than glass and produces stronger and stiffer parts at a given thickness.

Weight savings in the auto, transportation, and logistics based industries has been a major focus in order to make more fuel efficient vehicles both for ground and air transport. Weight savings using carbon reinforced composites in vehicle parts has helped these industries achieve meaningful weight savings. However, high quality surface finishes, such as a class-A surfaces in the auto industry that are characterized by a high surface sheen, are generally obtained only with highly tailored resin formulations that contain glass fibers, such as TCA® and TCA Ultralite® resins commercially available from Continental Structural Plastics, Inc. used in SMC or RTM, or metals such as aluminum and alloys thereof. Class-A surfaces are generally required for vehicle surface panels: doors, hoods, quarter panels, trunks, roof structures, bumpers, etc., which make up a significant amount of weight in a vehicle.

Furthermore, in the continuum of processes to lighten vehicle body panels, steel thickness was reduced and then supplanted with lower density materials such as aluminum and resin based materials. Evidence is developing that aluminum has several limitations that favor resin based vehicle body articles. It now appears that the material costs, forming costs and the tensile strength of aluminum at the thicknesses needed to achieve ever lighter body panels create a collective limitation. In contrast, resin based articles can be tailored by changes in resin chemistry and additives to meet a range of requirements. Additionally, while metal forming of complex shapes requires several steps, a well-designed mold can impart complex shapes in a single step.

Presently, passenger vehicle doors are constructed from many subcomponents which are required due to the complex geometries of the door assembly. FIG. 1 illustrates common side impact bars 16 and 18 for the front doors 12 and passenger doors 14, respectively. A side impact bar also known as an anti-intrusion bar or beam is a passive safety device, which is designed to protect passengers from side impacts. Side impacts are particularly dangerous since the location of impact is very close to the passenger, who can be immediately reached by the impacting vehicle. The role of the side impact bar is to absorb the kinetic energy of the colliding vehicles that is partially converted into internal work of the members involved in the crash.

The many subcomponents required to build a passenger vehicle door increases manufacturing times and costs, and decreases the overall reliability of the door assembly overtime. Furthermore, the typical overall weight of the door is over fifteen kilograms. Vehicle manufactures as previously noted are always looking to lighten assemblies while also maintaining or improving vehicle occupant safety.

Thus, there exists a need for a door design that utilizes composite materials to lower the weight of the door assembly, while improving the safety performance and manufacturability

SUMMARY OF THE INVENTION

A vehicle door assembly is provided that includes an upper frame, an inner frame structure in mechanical communication with the upper frame, an outer body panel, and a composite reinforcement component positioned between the outer body panel and the inner frame structure. The composite reinforcement component offers resistance to a side impact that limits intrusion into the passenger compartment. The composite reinforcement component is reinforced with continuous or chopped fibers, where the continuous or chopped fibers are at least one of glass, carbon, cellulosic materials, or a combination thereof. The composite reinforcement component may be formed by stamping or resin transfer molding (RTM).

BRIEF DESCRIPTION OF THE DRAWINGS

The present invention is further detailed with respect to the following drawings that are intended to show certain aspects of the present invention, but should not be construed as a limit on the practice of the present invention.

DESCRIPTION OF THE INVENTION

Figure 1:
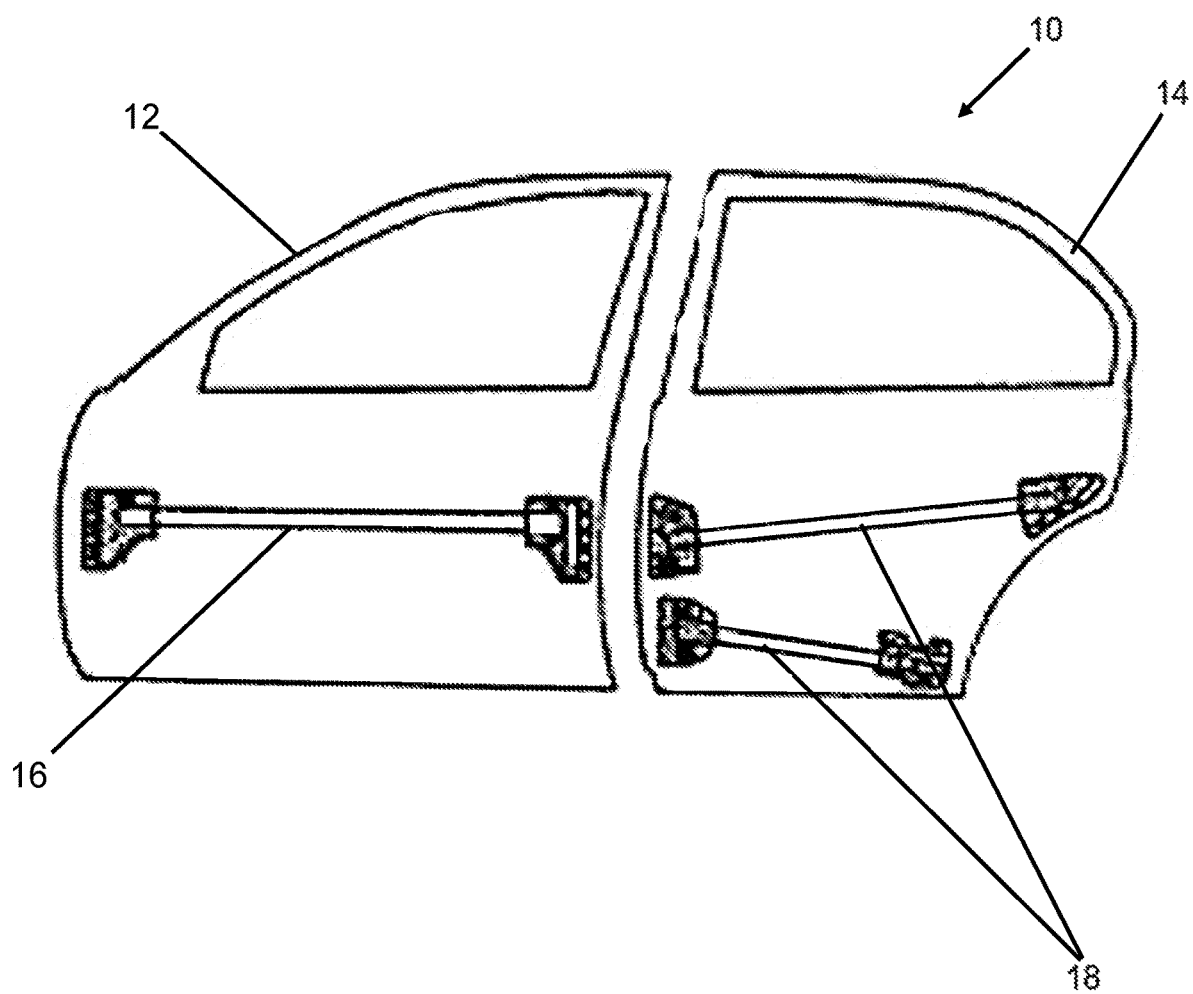
FIG. 1 is an existing prior art passenger vehicle door assemblies showing side impact bars.

The present invention has utility in the formation of a lightweight and simplified vehicle door assemblies compared to the prior art door assembly depicted in FIG. 1. Inventive embodiments of the door assembly simplify the design of a vehicle door into four main components, an upper frame positioned about the window, an inner frame structure, an outer body panel, and a composite reinforcement component. Embodiments of the inventive composite reinforcement component provide an all-in-one solution for a side impact cross beam, as well as an upper door reinforcement, a front door pillar reinforcement, and a rear door pillar reinforcement. Embodiments of the composite reinforcement component act to reinforce the overall door structure, offers resistance to a side impact that limits the intrusion into the passenger compartment, and offers resistance to a frontal impact by maintaining the spacing between the vehicle A and B pillars (for a front door) and pillar C and D for a back door. It is appreciated that a coupe vehicle door in which there is no window frame (Corvette for example) is readily made based on the current invention.

Embodiments of the composite reinforcement component may have continuous or chopped fibers. Reinforcing fibers illustratively include glass, carbon, cellulosic materials, and combinations thereof. The composite reinforcement component may be formed by stamping or resin transfer molding (RTM). It is noted that embodiments of the inventive composite reinforcement component may be molded as a single unified piece, as compared to the equivalent conventional construct in steel that is formed from more than four parts. Embodiments of the composite reinforcement component are compatible with door assemblies in which only a portion of a complete door is formed with composite materials such as the inner frame structure, the outer body panel and/or the upper frame, with the remaining door components being formed of conventional steel or aluminum constructs.

Figure 2:
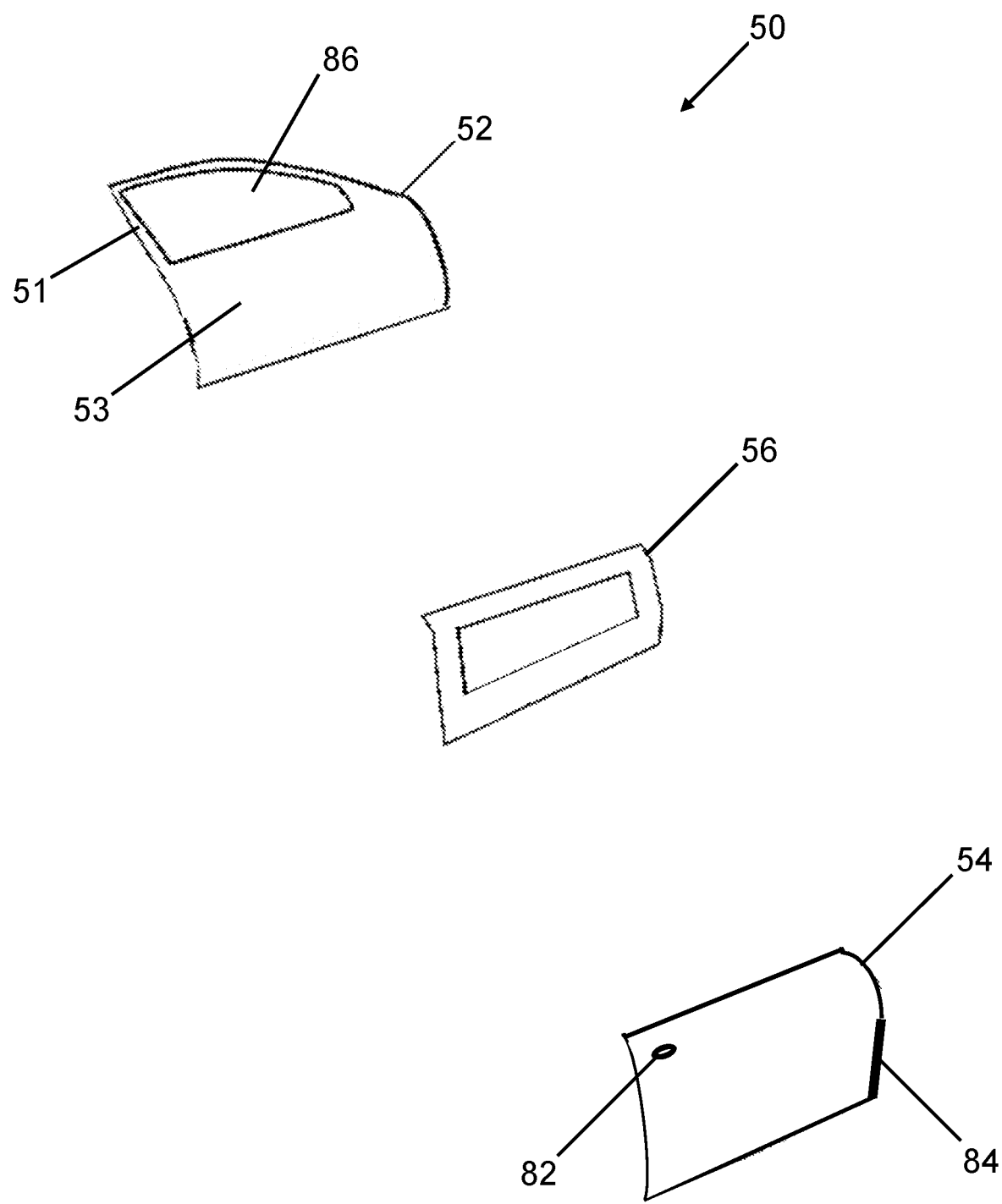
FIG. 2 is an exploded view of a door assembly with a composite reinforcement component according to embodiments of the invention.

Referring now to the figures, FIG. 2 shows an exploded view of an inventive vehicle door assembly 50 with three primary components a combined upper and inner frame structure 52 having an upper section 51 that defines a window opening 86 and having a lower section 53, a composite reinforcement component 56, and an outer body panel 54.

Figure 3:
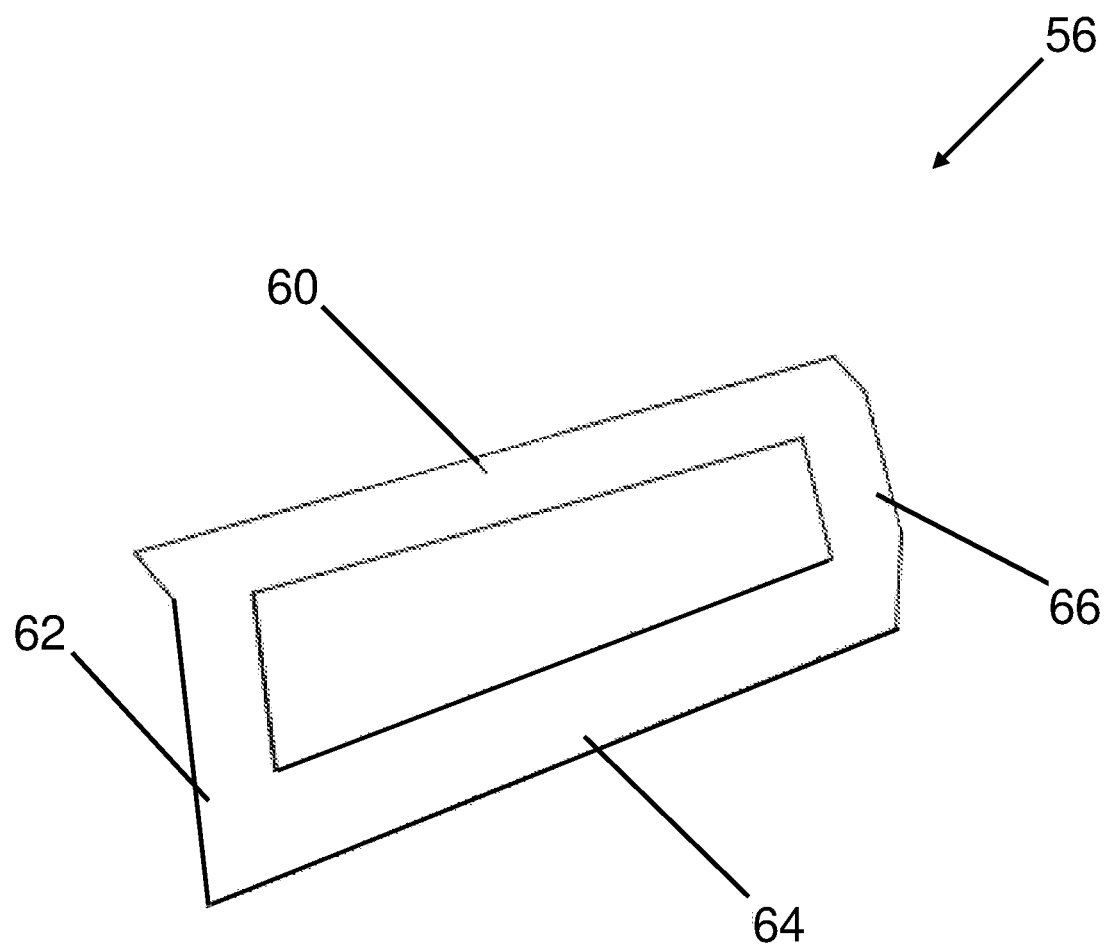
FIG. 3 is an expanded perspective view of the composite reinforcement component used in FIG. 2 according to embodiments of the invention.

FIG. 3 is an expanded perspective view of the composite reinforcement component 56 used in FIG. 2 according to embodiments of the invention. The upper portion 60 of the composite reinforcement component 56 provides reinforcement to the upper section 51 of the combined upper and inner frame structure 52 of the door assembly 50, and offers better resistance to a frontal crash and the resultant compressive forces. The left side 62 of the composite reinforcement component 56 increases the stiffness of the door assembly 50 in the lock area 82 (shown in FIG. 2) and the side cross beam 64. The primary function of the side cross beam 64 is to protect the driver or the passenger in a side impact accident. The right side 66 of the composite reinforcement component 56 increases the stiffness of the door assembly 50 in the attachment area 84 where hinges are attached to secure the door to the vehicle frame, as well as increasing the stiffness of the side cross beam 64.

In specific embodiments components that are reinforced with chopped and dispersed glass fibers in the outer body panel 54 may have weight reducing glass microspheres that are joined by adhesives or mechanical fasteners to a second cured layer reinforced with dispersed carbon fibers or a combination of carbon, glass, and natural fibers in a resin transfer molding (RTM) formed epoxy matrix. Embodiments of the invention may have the outer layer body panel 54 formed using a class-A finish SMC illustratively including TCA ULTRALITE® resins commercially available from Continental Structural Plastics, Inc. as disclosed in commonly owned U.S. Patent Publication 2005/0182205, and with hollow glass microspheres as disclosed in U.S. Pat. No. 9,018,280 both of which are included herein in their entirety.

It is noted that while glass fiber may predominate as a fiber filler in the outer panel layer 54, there may be lesser amounts of carbon or natural fibers present.

Embodiments of the vehicle door assembly 50 may be formed with a TCA ULTRALITE® SMC outer 54 and carbon fiber or hybrid fiber epoxy RTM inner (52, 56) provides the following properties including: an assembly that is 10-15% lighter than aluminum, more cost effective than previous body part constructions, and an increased design flexibility.

In certain inventive embodiments, a cured inner portion of molding composition is reinforced predominantly with chopped carbon fibers is joined to a cured outer skin of a second sheet molding composition reinforced predominantly with glass fiber, where the outer surface has an automotive surface quality finish, such as a class-A finish. As used herein, a class-A surface finish is associated with a surface shine and reflectivity required for exterior body panels by automotive manufacturers. In an embodiment, the cured inner portion is substantially devoid of glass fiber, while the outer skin is substantially devoid of chopped carbon fiber.

A class "A" surface as used herein is defined to be a cured SMC or BMC material amenable to painting to a surface gloss of a conventional production new vehicle per ASTM D523. Such a material containing unsaturated polyester resin, thermoplastic additives, organic peroxides, inhibitor, filler, mold release and pigment is sold by Continental Structural Plastics, Inc. under the trade name TCA®.

As used herein "molding compositions" refers to SMC, BMC and RTM resin formulations that are amenable to loading with chopped fibers of glass or carbon.

In a particular inventive embodiment, carbon fibers in a molding composition are present in an inner layer of a vehicle door component containing from 10 to 40% by weight carbon fibers of the inner layer, with an outer skin layer of SMC based on the commercially available TCA® or TCA ULTRALITE® (Continental Structural Plastics, Inc.) containing glass fiber containing between 10 and 60% glass fiber by weight of the TCA® portion, as embodied in U.S. Pat. No. 7,655,297. The ratio of thickness of the inner portion to the outer skin ranges from 01-10:1. The resulting SMC inner portion layer and outer skin layer are laid out, formed, and cured separately and the two layers joined thereafter to form a component. Such a door component with inner components (52, 56) containing carbon fibers is noted to have a density that is 10, 20, 30 and even 40% lower than the comparable article formed wholly from TCA® or other class-A surface finish resin. In this way, a lightweight article is formed that retains the high surface gloss of a class-A surface. It is appreciated that a given component in the door assembly, may include both carbon fibers and glass fibers in combination, as well as other types of fibers such as natural cellulosic fibers that illustratively include coconut fibers with the proviso the loading of other types of fibers is limited such that glass fibers are predominantly present in the outer surface panel 54 and carbon fibers are predominantly present in the inner frame/structural components (52, 56). The predominant presence of a given type of fiber is used herein to mean that the fiber type represents more than 50% by weight of the total fiber weight of fibers present in the layer. In certain embodiments, each layer is 100% of a given type of fiber, while in other embodiments the predominant fiber is present between 51 and 99%.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In another inventive embodiment, carbon fibers are dispersed in a methyl methacrylate monomer based molding composition. Other suitable monomers from which a molding composition formulation is produced illustratively include unsaturated polyesters, epoxies, and combinations thereof. A molding composition formulation based on epoxy illustratively includes bis-phenol-A and Novolac based 5 epoxy terminated resins. Suitable curing agents for such an epoxy based molding composition formulation illustratively include anhydrides such as trimellitic anhydride, methyl tetrahydrophthalic anhydride (MTHPA), nadic methyl anhydride (NMA), di- and tri-functional amines, and combinations thereof.

In another inventive embodiment of the present invention, carbon fibers are dispersed in a molding composition monomer or solution containing monomer with a relative polarity of greater than 0.26, and in certain embodiments greater than 0.5, and in still other embodiments between 0.5 and 0.8. Relative polarity is defined per Christian Reichardt, Solvents and Solvent Effects in Organic Chemistry, Wiley-VCH, 3rd edition, 2003.

In another inventive embodiment, the carbon fibers are dispersed in molding composition formulations prior to cure resulting in a reinforced SMC, BMC or RTM cured article that has a lower density overall, and a lower percentage by weight loading of fibers, as compared to a like layer formed with glass fiber reinforcement. Additionally, through the use of coupling agents superior tensile strength is achieved.

In certain inventive embodiments, heat is applied under suitable atmospheric conditions to remove any sizing or other conventional surface coatings on the surface of the carbon fibers prior to contact with a molding composition that upon cure forms a matrix containing the carbon fibers. In still other inventive embodiments heat is applied under an inert or reducing atmosphere to promote pyrolysis of the sizing from the core carbon fibers. It is appreciated that recycled carbon fiber is operative in an inventive two-piece vehicle component.

As carbon dissipates heat much better than glass as known from the respective coefficients of linear thermal expansion (CLTE), a predominantly carbon fiber filled layer cools more quickly than an otherwise like layer predominantly glass fiber filled. This difference in dynamic cooling after cure is compounded for thinner carbon fiber filled layers making them especially prone to warpage. Therefore, due to the differences in CTLE and material stiffness between the predominantly glass fiber filled layer and predominantly carbon filled layer, joining bonding agents must have exceptional elongation ability to compensate for the differential CTLE of the joined layers over the temperature range of −40 to 140° F. (−40 to 60° C.), and even as high as 400° F. (205° C.) associated with cure conditions and hot joinder of layers. In specific inventive embodiments, elastomeric bonding agents may be used to bond the inner layer to the outer layer. Elastomeric bonding agents operative herein to join disparate layers of an inventive component illustratively include urethanes, epoxies, and a combination thereof. In certain inventive embodiments, the bonding flange thickness is increased from ¼-½ inch (0.63-1.27 cm) for joining like fiber filler layers together to 1-1.5 inches (2.54-3.81 cm) for the inventive two-piece construction.

In some inventive embodiments, the microspheroids used in the outer panel 54 have a mean diameter of between 12 and 45 microns. In still other inventive embodiments, the microspheroids have an outer dimension of between 16 and 45 microns. Typically, microspheroids are loaded into a base SMC or BMC class-A formulation from 2 to 20 total weight percent of the resulting formulation. The specific amount of microspheroids added into a given molding composition formulation is dependent on factors including desired article density, microspheroid size dispersion and mean particle dimension, required article strength, required article shrinkage, and required article surface smoothness.

In a particularly preferred embodiment of the present invention, the microspheroids are pretreated with a surface coating adherent to the microspheroid surface.

A microspheroid surface is readily derivatized to bond to a surrounding resin matrix during cure. The resulting article exhibits improved physical properties.

One type of surface derivative for a microspheroid is a heteroatom functionally terminated thermoplastic coating. The heteroatom containing terminus illustratively includes a tertiary amine-, hydroxyl-, imine- or cyano-moiety. It is appreciated that such moieties under appropriate cure conditions known to the art are able to react with matrix resin components during cure to further strengthen a cured article. Tertiary amine terminated thermoplastic are readily prepared. D. H. Richards, D. M. Service, and M. J. Stewart, Br. Polym. J. 16, 117 (1984). A representative tertiary amine terminated thermoplastic is commercially available under the trade name ATBN 1300 X 21 from Noveon.

A surface activating agent that bonds to a glass microspheroid is an alkoxysilane where the silane is reactive with the silica surface of the microspheroid. Representative alkoxysilane surface activating agents for the microspheroid illustratively include:

3-aminopropyltrimethoxysilane, 3-aminopropyltriethoxysilane, 3-glycidoxypropyltrimethoxysilane, 3-glycidoxypropyltriethoxysilane, (3-glycidoxypropyl) bis(trimethylsiloxy)methylsilane, (3-glycidoxypropyl)methyldiethoxysilane, (3-glycidoxypropyl)dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl)tetrasulfide, and combinations thereof. In some inventive embodiments, the silane surface activating agent includes an ethenically unsaturated moiety that is reactive under free radical cross-linking conditions so as to covalently bond with the hollow glass microsphere to the surrounding SMC or BMC class-A matrix.

Figure 4:
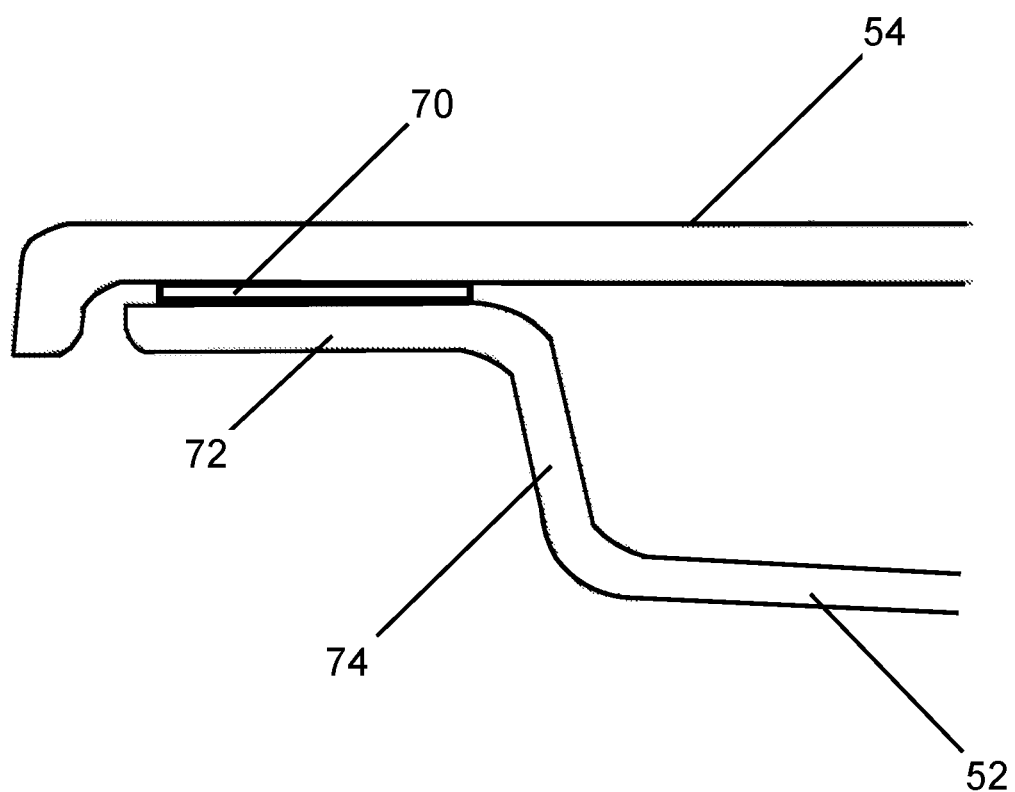
FIG. 4 is a cross section of a typical body panel seal flange where the glass fiber based class-A outer panel is bonded (adhesive, epoxy, etc.) or secured at a bond flange of the carbon or hybrid fiber based structural inner panel according to embodiments of the invention.

FIG. 4 is a cross section of a typical body panel seal flange where the glass fiber based class A outer layer 54 is bonded 70 (adhesive, epoxy) or secured at a bond flange 72 of the carbon fiber based structural inner components, namely the inner frame 52, as shown in FIG. 4, or the composite reinforcement 56 according to embodiments of the invention. Vehicles are generally constructed around a frame, where a vehicle has finished surface panels that are secured or bonded to substructures to form body panels that are designed for attachment to the irregular surfaces of the frame. The bond flange 72 follows a corresponding seal carrying surface. The "hat" section 74 of the structural inner components (52, 56) extend to reach and attach to the frame (not shown).

The foregoing description is illustrative of particular embodiments of the invention, but is not meant to be a limitation upon the practice thereof. The following claims, including all equivalents thereof, are intended to define the scope of the invention.

The invention claimed is:

1. A vehicle door assembly comprising:
a combined upper and inner frame structure having an upper section and a lower section;
an outer body panel; and
a unitary composite reinforcement component positioned between said outer body panel and said combined upper and inner frame structure having an upper portion of the composite reinforcement component that provides reinforcement to the upper frame, a cross beam, a left side that increases the stiffness in an area of the vehicle door assembly that supports a lock and the cross beam, a right side that increases the stiffness of the door assembly in an area of the vehicle door assembly in order to support a hinge and the cross beam, the composite reinforcement component forming a four-sided structure of substantially the same thickness formed by stamping or resin transfer molding (RTM) formed matrix containing continuous fibers or chopped fibers.

2. The vehicle door assembly of claim 1 wherein said composite reinforcement component offers resistance to a side impact.

3. The vehicle door assembly of claim 1 wherein said composite reinforcement component offers resistance to a frontal impact.

4. The vehicle door assembly of claim 1 wherein said composite reinforcement component is reinforced with non-chopped fibers or chopped fibers.

5. The vehicle door assembly of claim 4 wherein the non-chopped fibers or chopped fibers are at least one of glass, carbon, or cellulosic materials.

6. The vehicle door assembly of claim 1 wherein the cross beam is a lower portion of the composite reinforcement component.

7. The vehicle door assembly of claim 1 wherein said composite reinforcement component performs as a side impact cross beam or an upper door reinforcement.

8. The vehicle door assembly of claim 1 wherein said upper frame is positioned about a window opening.

* * * * *